United States Patent [19]

Pfrimmer

[11] Patent Number: 5,531,062
[45] Date of Patent: Jul. 2, 1996

[54] TENSIONING MECHANISM FOR UPPER MOWER CONDITIONER ROLL

[75] Inventor: Ernest Pfrimmer, Paris, France

[73] Assignee: Deere & Company, Moline, Ill.

[21] Appl. No.: 402,672

[22] Filed: Mar. 13, 1995

[30] Foreign Application Priority Data

May 28, 1994 [DE] Germany ............................ 44 18 696.7

[51] Int. Cl.[6] ............................................. A01D 82/00
[52] U.S. Cl. ................. 56/16.4 B; 56/10.2 J; 56/DIG. 1
[58] Field of Search ........................... 56/16.4 B, 16.4 A, 56/16.4 C, DIG. 1, DIG. 2, 10.2 J

[56] References Cited

U.S. PATENT DOCUMENTS

| 3,820,311 | 6/1974 | Sawyer et al. | 56/14.4 |
|---|---|---|---|
| 4,843,804 | 7/1989 | Wellman | 56/16.4 C |
| 4,850,183 | 7/1989 | Fox | 56/16.4 A |
| 4,961,303 | 10/1990 | McCarty et al. | 56/DIG. 1 X |
| 5,033,257 | 7/1991 | Walters | 56/DIG. 1 X |

*Primary Examiner*—Terry Lee Melius

[57] ABSTRACT

A mower conditioner includes parallel upper and lower conditioning rolls with the upper roll having opposite ends respectively rotatably mounted in a pair of vertically swingable arms and thereby being moveable toward and away from the lower roll. Associated with each arm is a tensioning mechanism including a lever having its lower end pivotally mounted at a location just below a lower forward location of the upper roll when the latter is in a lowermost initial position. A rearwardly acting biasing element is attached to the upper end of the lever for yieldably urging the latter rearwardly. Mounted to the lever between its upper and lower ends is a cam follower which is located in contact with a cam mounted to the forward end of the roll support arm. The geometrical relationship between the follower and first and second contact surfaces of the cam is such that, as the upper roll is forced upward away from the lower roll in increasing amounts in a normal range of movement by crop material or foreign objects passing between the rolls, the follower will be in contact with the first contact surface and the biasing element will be increasingly loaded so as to resist such movement of the upper roll and such as to increase the pressure exerted by the crop material or foreign object on the rolls; and such that, as the upper roll is forced upward into an abnormal range of movement beyond the normal range, the follower will be in contact with the second contact surface and little or no increase in the load exerted by the biasing element and little or no increase in the pressure acting between the rolls will be experienced.

14 Claims, 2 Drawing Sheets

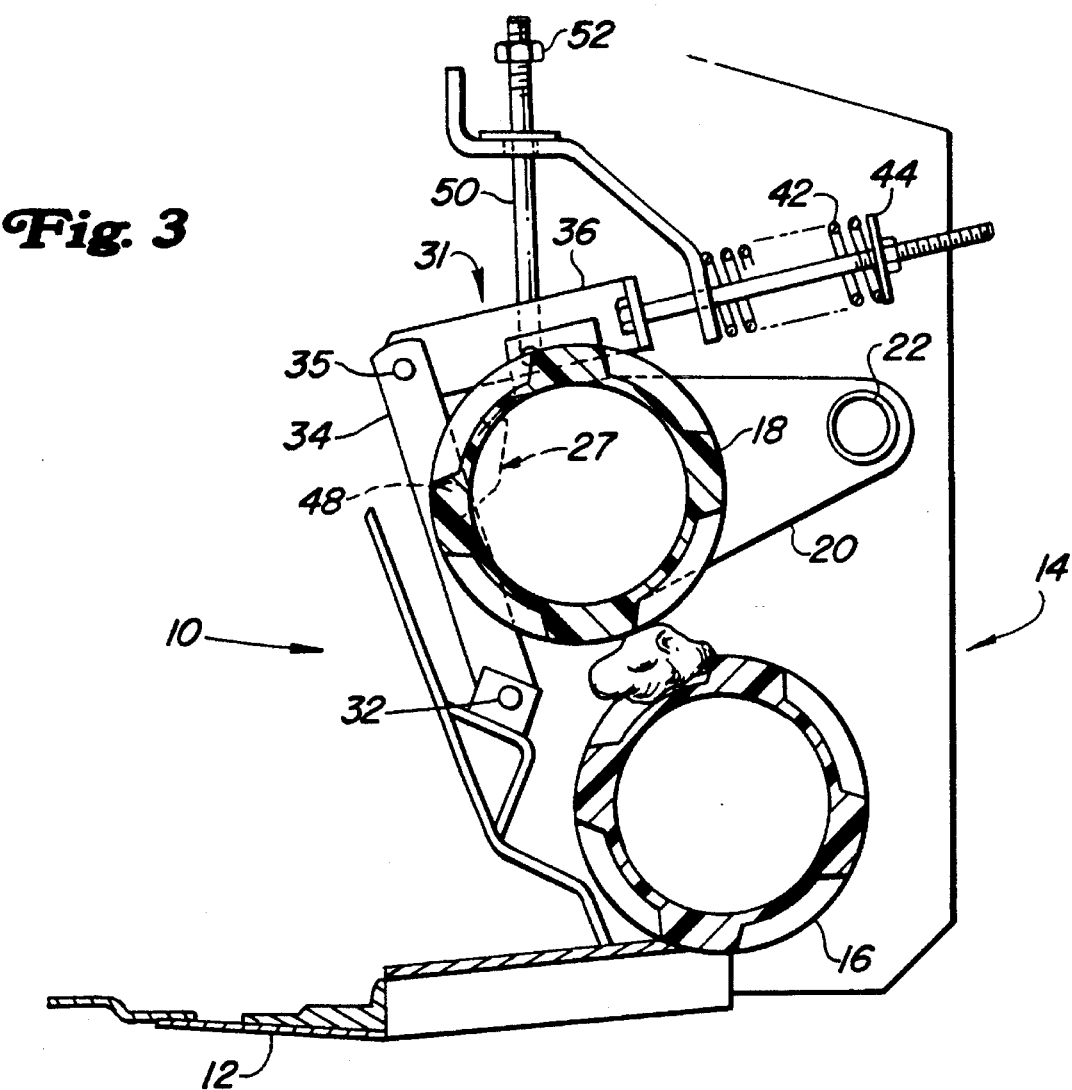
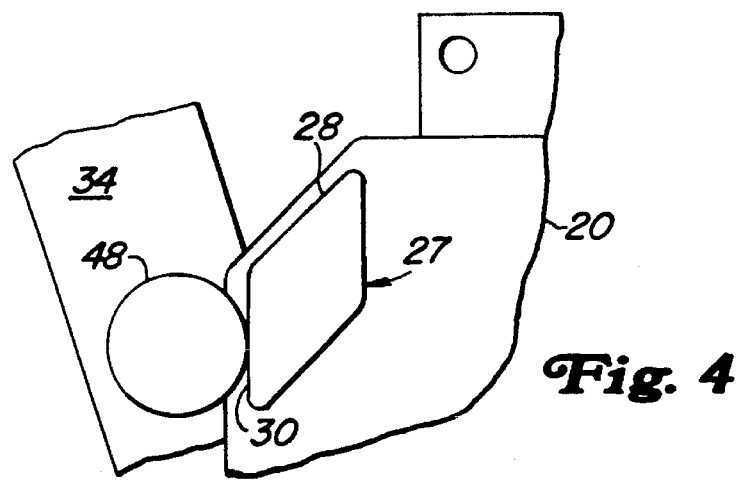

TENSIONING MECHANISM FOR UPPER MOWER CONDITIONER ROLL

BACKGROUND OF THE INVENTION

The invention concerns a roll type mower conditioner with two rolls located adjacent each other which define a gap or nip between them for taking in crop that is to be processed and where at least one of the rolls has its opposite ends supported in bearings respectively provided in a pair of pivotally mounted arms and is yieldably restrained from moving away from the other roll by an external force.

Roll conditioners with two counter-rotating rolls are used, among other applications, to compress crop such as corn, grass or the like so that moisture or nutrients contained therein can be excreted. Accordingly, such roll conditioners can be found assembled with mowers or ensilage harvesters.

U.S. Pat. No. 3,820,311 granted to Sawyer et al on 28 Jun. 1974 discloses a so-called mower conditioner having a transverse beam supporting a cutterbar which is followed by a pair of conditioning rolls. Both conditioning rolls are provided with an embossed rubber coating, with the upper of the two rolls being supported at both ends in pivoting arms. A tensioning mechanism comprises a linkage connected to each arm and a helical extension spring connected to each linkage such that the arms are biased toward, and the upper roll is urged against, and yieldably restrained from moving away from, the lower roll. In this way, pressure sufficient to process the crop is applied to the crop flowing between the two rolls.

This patent is representative of art wherein an increase in the thickness of the mat of crop flowing between the rolls forces the upper roll away from and thus results an increase in the space between the two rolls and a corresponding increase in the spring force which not only increases the pressure on the crop passing between the rolls but also on the rubber coating. In the case that a foreign object, such as a stone or branch, is introduced between the two rolls, the rubber coating may be damaged if the pressure exceeds a certain value.

SUMMARY OF THE INVENTION

According to the present invention, there is provided a novel mechanism for applying tension to the upper roll of a roll type mower conditioner.

An object of the invention is to provide a roll tensioner which operates in such a way as to prevent excessive force from being exerted on the rubber coated surface of the conditioner rolls as when a foreign object deflects the upper roll away from the lower roll by a distance greater than that occurring during normal operation.

Yet a more specific object of the invention is to provide a biased linkage for exerting a force tending to resist movement of the upper conditioner roll away from the lower roll, the linkage including a cam follower engaged with a cam carried by the upper roll support arm, with the geometry of the cam being such that the force resisting movement of the upper roll away from the lower roll remains substantially constant once the lower roll moves beyond a normal operating distance from the lower roll.

These and other objects will become apparent from a reading of the ensuing description together with the appended drawing.

BRIEF DESCRIPTION OF THE DRAWINGS

FIG. 3 is a view similar to that of FIG. 1 but showing the upper conditioner roll separated from the lower roll by a stone passing between the rolls, the distance of roll separation being beyond that occurring during normal operation.

FIG. 4 is an enlarged view of a portion of FIG. 3 showing the engagement between the cam follower carried by the tensioner link and a second contact surface of a cam carried by the upper roll support arm.

DESCRIPTION OF THE PREFERRED EMBODIMENT

Figure 1:
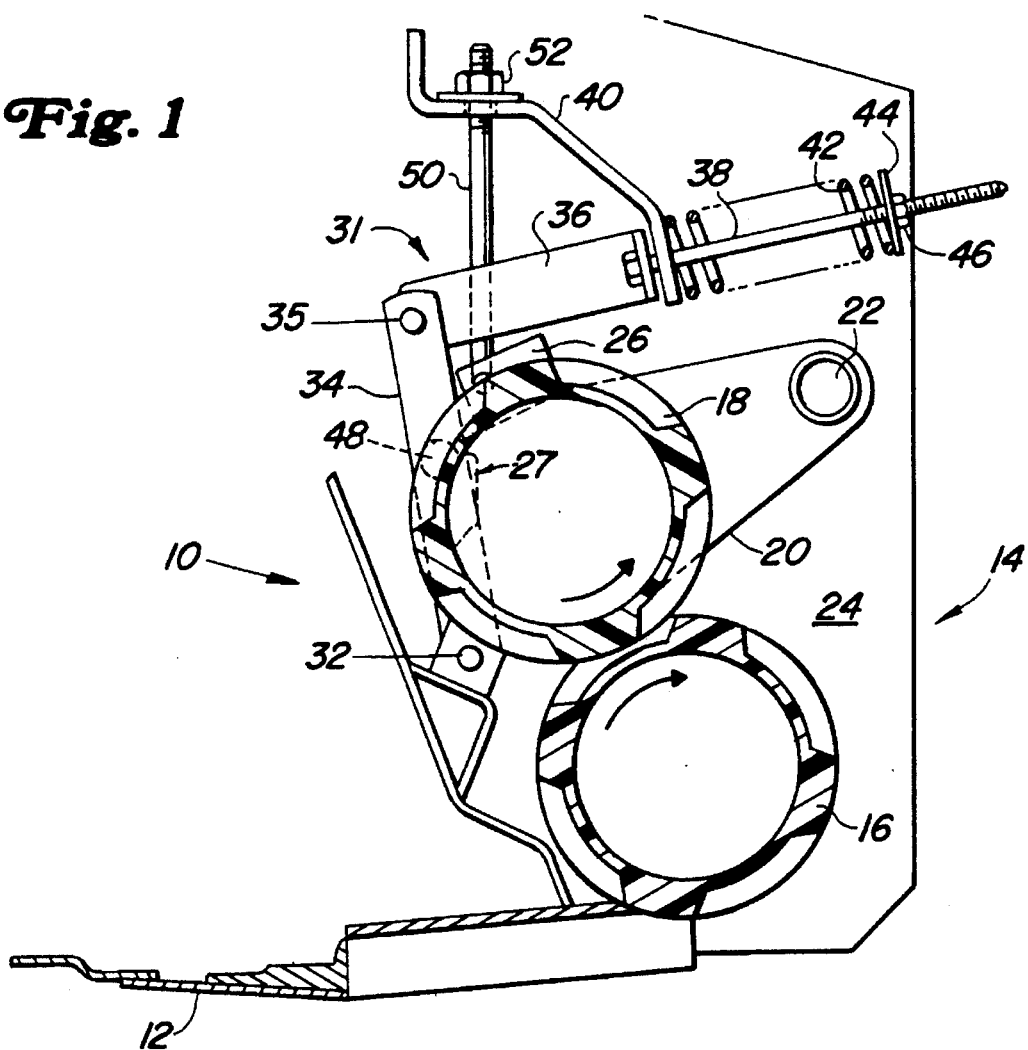
FIG. 1 is a somewhat schematic, left end elevational view of a vertical section of a header embodying a tensioning mechanism of the present invention and showing the upper conditioner roll and right-hand roll support arm in an initial position without any crop passing between and causing a load to be exerted on the rolls.

FIG. 1 shows a side view of a pertinent section of a header of a mower conditioner 10 having a mower beam 12 carrying a cutterbar (not shown) and a roll type crop conditioner 14 located rearwardly of the beam 12 for receiving crop cut from the ground, as is well known.

The conditioner 14 includes a lower roll 16 supported in bearings (not shown) fixed to opposite side walls of the header frame 24. The conditioner 14 further includes an upper roll 18 having opposite ends respectively supported in a pair of bearings located in front end regions of roll support arms 20 (only one shown) at opposite ends of the roll 18. Both rolls 16, 18 are provided with an embossed rubber coating on their circumferential surfaces, where the embossed shape is configured in such a way that the raised areas of one roll engage the depressions on the other roll when the rolls 16, 18 rotate against each other or with respect to each other. In order to permit the upper roll 18 to move vertically with respect to the lower roll 16, each arm 20 has a rear end region supported for swinging freely in a bearing 22 carried by the frame 24.

Each arm 20 is provided with a down stop connection tab 26 at an upper forward end region. As can best be seen in FIGS. 2 and 4, each arm 20 is further provided with a cam 27 mounted to a forward region of the arm. The cam 27, in side view, appears as a parallelogram having front and top surfaces respectively serving as contact surfaces 28 and 30. While the cam 27 is here shown as being formed as an integral part of the arm or lever 20, it could be made as a separate piece or pieces which is or are adjustable for producing different geometric relationships resulting in different operating characteristics, as will be understood from the description appearing below. Whether fixed or adjustable, it will be apparent that the orientation of the contact surfaces 28 and 30 of the cam 27 will change as the arm 20, and, hence, the upper roll 18 swings upwardly away from the lower roll 16.

Provided for cooperating with the cam 27 for yieldably resisting upward movement of each arm 20 is a roll tensioning mechanism 31 comprising a pivot lever 34 having its lower end pivotally mounted to the frame 24, as by a pin 32 located at a below a forward portion of the periphery of the upper roll 18 when the latter is in its initial position shown in FIG. 1. The pivot lever 34 extends nearly vertically from the pin 32 and has an upper end which terminates above the upper roll 18.

In its upper end region, the lever 34 is pivotally connected, as at a pin 35, to the forward end of a bracket 36, which in turn has a tab at its rear end in which an elongate bolt 38 is slidably mounted. The bolt 38 extends through a hole provided in a retainer 40 that is fixed to the frame 24.

Received on the bolt 38 on the opposite side of the retainer 40 from the bracket 36 is a coil compression spring 42. A washer 44 is received on the bolt 38 and a nut 46 forces the washer against the end of the spring 42 so as to preload the latter against the back side of the retainer 40. As a result of this load, the bracket 36 is biased rearwardly resulting in the pivot lever 34 being biased in the clockwise direction. Obviously, the tensioning mechanism could be fashioned to use an extension spring, torsion bar, leaf spring or gas spring in lieu of the compression spring 42.

Mounted to the lever 34 at a location between the bearing 32 and the connection pin 35 is a cam follower 48 which is here shown as a solid cylindrical pin. However, the follower could be in the form of a roller including roller bearings. In any event, the follower 48 is positioned for contact with one or the other of the cam contact surfaces 28, 30 depending on the distance the upper roll 18 is separated from the lower roll 16. Due to the biasing action of the spring 42, the cam follower 48 is constantly forced against the particular contact surface 28 or 30 with a particular external force corresponding to that stored in the spring 42.

A down stop 50, configured as an L-shaped rod, has its lower end received in a hole provided in the tab 26 carried by the arm 20. The stop 50 extends approximately vertically from the tab 26 and is positioned in a hole provided in the retainer 40 where its downward movement is determined by a nut 52 screwed onto threads provided at its upper region. Depending on the location of the nut 52, the position of the down stop 50 can be preset with respect to the retainer 40 which in turn results in the minimum spacing between the lower and upper rolls 16 and 18 being preset.

It can be seen in FIG. 1 that, with the existing adjustment of the down stop 50, the upper roll is preset in an initial position establishing a gap between the rolls 16, 18 through which crop to be compressed is conducted after leaving the cutterbar carried by the mower beam 12. With no crop or other material passing between the rolls, this gap may, for example, be 5 mm.

Figure 2:
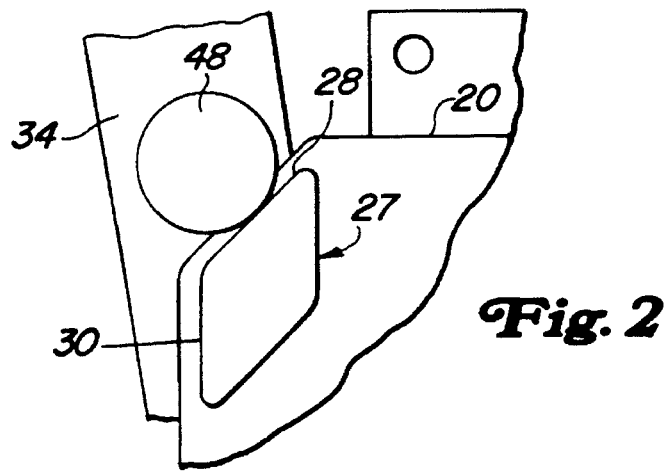
FIG. 2 is an enlarged view of a portion of FIG. 1 showing the engagement between the cam follower, carried by the tensioner link, and a first contact surface of a cam carried by the upper roll support arm.

FIG. 2 illustrates the relationship between the follower 48 and the cam surfaces 28, 30 when the upper roll is in its initial position, as when no crop or other material is passing between the rolls 16, 18. According to this drawing, the follower 48 is in contact with the upper surface 28 of the cam 27, the surface 28 extending at an angle between 45° and 60° to the longitudinal centerline of the pivot lever 34. It can be seen that, during a forced upward movement of the roll 18 caused by crop or other material passing between the rolls 18, 16, the arm 20 and cam 27 will likewise move upwardly resulting in the horizontal component of force at the interface of the follower 48 and cam surface 28 acting to pivot the lever 34 in the counterclockwise direction against the loading of the spring 42. The force required to lift the upper roll 18 and, thus the contact pressure between the rolls, increases as the counterclockwise movement of the lever 34 increases to the point where the cam follower 48 comes into contact with the almost vertical cam surface 30. This contact of the follower 48 with the cam surface 30 happens when the gap between the rolls 16, 18 reaches approximately 20 mm.

Referring now to FIG. 3, it can be seen that an object, such as a stone, is in the gap between the rolls 16, 18 and has forced the upper roll 18 a considerable distance from the lower roll 16. In this condition, upward movement of the roll 18 and hence arm 20 has resulted in the downstop 50 moving upwardly through the hole provided in the retainer 40, in the cam 27 acting on the cam follower 48 so as to cause the lever 34 to rotate farther in the counterclockwise direction causing further loading of the spring 42 and in moving the follower 48 into contact with the surface 30 of the cam 27. Referring now also to FIG. 4, it can be seen that the surface 30 is nearly vertical and thus close to being parallel with the longitudinal axis of the pivot lever 34, and that further upward forcing of the upper roll 18 from the lower roll 16 will not result in any appreciable counterclockwise movement of the lever 34 to thus further load the spring 42. Thus, this movement will not result in any appreciable increase in the pressure exerted on the rubber surfaces of the rolls. Accordingly, the rubber coating of the rolls is kept from being damaged.

As soon as the stone or other foreign object has passed through the rolls 16, 18, the weight of the upper roll 18 overcomes the resistance offered by the follower 48 being biased against the cam surface 30 and the roll 18, together with the arms 20, falls downward into their normal operating range with the follower 48 engaged with the surface 28.

It should be noted that instead of both ends of the roll 18 having a tensioning mechanism associated therewith, as described above, the objects of the invention could be accomplished by using only one such tensioning mechanism associated with the support arm at one of the roll ends. Further, it should be noted that the positions of the cam 27 and cam follower 48 could be switched so that the cam 27 is mounted to the pivot lever 34 and the cam follower 48 is mounted to the arm 20. In fact, the particular cam and cam follower design used could differ in a variety of ways so long as the interaction between them results in the resistance, offered by the spring 42, to upward movement of the upper roll 18 beyond that experienced during normal operation, remaining at a value which is less than that which would result in damaging pressures being experienced by the rubber coated surfaces of the rolls 16, 18 when a foreign object such as a stone or branch passes therebetween.

I claim:

1. In a mower conditioner including upper and lower, parallel transverse conditioner rolls with the lower roll having opposite ends respectively rotatably mounted in opposite walls of a header frame and with the upper roll having opposite ends respectively rotatably mounted in a pair of pivot arms which are in turn vertically pivotably mounted in said opposite walls, whereby the upper roll and arms move up and down from and to an initial position, and a tensioner mechanism being associated with at least one of the arms for yieldably resisting upward movement of the upper roll, the improvement comprising: said tensioning mechanism comprising a lever mounted for pivoting in a region located adjacent said at least one of said arms for movement from and toward a starting position corresponding to said initial position of said at least one arm, and a yieldable biasing means attached to said lever and resisting pivotal movement of the lever away from said starting position; one of said lever and said at least one of said arms having a cam mounted thereon and the other having a follower mounted thereon; and said cam having a first surface engaged by said cam follower, during a normal operating range of movement of said one arm and said upper roll between said initial position and a maximum working position, and having a second surface engaged by said cam follower when said arm and said upper roll are moved upwardly from said initial position beyond said normal range of movement; and said first and second surfaces being configured such that increasing upward movement of said one arm and said upper roll in said normal range of movement results in said lever undergoing increasing movement from its starting position and in an increase in the resistant force exerted by said yieldable biasing means, and such that increasing upward movement of said one arm and said upper roll beyond said normal range of movement results in substantially no additional movement of said lever nor in any substantial increase in the resistant force exerted by said yieldable biasing means.

2. The mower conditioner defined in claim 1 wherein said cam is mounted to said at least one arm and said cam follower is mounted to said lever.

3. The mower conditioner defined in claim 2 wherein said lever is mounted to said header frame for pivoting about an axis extending parallel to said rolls and said cam follower is cylindrical; said first and second surfaces of said cam being planar and respectively forming front and top surfaces of said cam; said second surface and lever being substantially vertical and said first surface being at an angle between 45° and 60° from a longitudinal axis of said lever when said at least one arm is beyond said normal range of movement from said initial position.

4. The mower conditioner defined in claim 3 wherein a lower end of said lever, as viewed from the side, is pivoted at a location adjacent a lower forward peripheral portion of the upper roll when the latter is in its initial position; said tensioning means being attached to an upper end of said lever and said cam follower being located between said lower and upper ends of said lever.

5. The mower conditioner defined in claim 4 wherein said tensioning means includes a bracket pivotally attached to and extending rearwardly from said upper end of said lever; a retainer forming part of said header frame and being located adjacent a transverse tab at a rear end of the bracket; an elongate bolt extending rearwardly through said tab and retainer; a coil compression spring being received on said bolt behind said retainer; and a washer being received on said bolt and secured against a rear end of said spring by a nut threaded onto said bolt, whereby adjusting said nut along said bolt can establish a desired preload in said spring for resisting upward movement of said at least one arm and upper roll.

6. The mower conditioner defined in claim 4 and further including a down stop connected between said header frame and said at least one arm for presetting said initial position of said at least one arm and upper roll so as to establish a desired initial gap between said upper and lower rolls.

7. The mower conditioner defined in claim 6 wherein said down stop comprises an L-shaped rod having a lower end secured in a bracket fixed to said at least one arm; a retainer forming part of said header frame and including a generally horizontal region spaced vertically above said bracket; said rod extending through said region of said retainer and having a threaded upper end; and an adjustment nut being received on said threaded upper end of said rod.

8. In a crop conditioner roll arrangement including upper and lower, parallel conditioner rolls with the lower roll having opposite ends rotatably mounted in a frame and with the upper roll having opposite ends respectively rotatably mounted in a pair of roll suppose arms which are vertically pivotably mounted to the frame such that a mat of crop material or a foreign object passing between the rolls will exert a pressure on the rolls and move the upper roll away from the lower roll, and a tensioning mechanism being associated with at least one of said suppose arms and including a biasing means yieldably resisting movement of said at least one of said suppose arms and, hence, said upper roll, away from said lower roll, the improvement comprising: said tensioning mechanism including a lever pivotally mounted to said frame; one of said lever and said at least one of said support arms having a cam mounted thereon and the other having a follower mounted thereon; said cam follower including first and second contact surfaces with said cam follower being engaged with said first contact surface when the upper roll is in a normal range of movement above said lower roll and said cam follower being in contact with said second contact surface when the upper roll is in a range of movement beyond said normal range of movement; and the geometrical relationship between said cam follower and said first and second contact surfaces being such that said biasing means will act with an increasing force to resist increasing displacement of the upper roll away from the lower roll when the upper roll is moving in said normal range of movement, and will act with little or no increase in force to resist increasing displacement of the upper roll away from the lower roll when the upper roll is moving beyond said normal range of movement.

9. The conditioner roll arrangement defined in claim 8 wherein said cam is mounted to said at least one arm and said cam follower is mounted to said lever.

10. The conditioner roll arrangement defined in claim 9 wherein said lever is mounted to said header frame for pivoting about an axis extending parallel to said rolls and said cam follower is cylindrical; said first and second surfaces of said cam being planar and respectively forming front and top surfaces of said cam; said second surface and lever being substantially vertical and said first surface being at an angle between 45° and 60° from a longitudinal axis of said lever when said at least one arm is beyond said normal range of movement from said initial position.

11. The conditioner roll arrangement defined in claim 10 wherein a lower end of said lever, as viewed from the side, is pivoted at a location adjacent a lower forward peripheral portion of the upper roll when the latter is in its initial position; said tensioning means being attached to an upper end of said lever and said cam follower being located between said lower and upper ends of said lever.

12. The conditioner roll arrangement defined in claim 11 wherein said tensioning means includes a bracket pivotally attached to and extending rearwardly from said upper end of said lever; a retainer forming part of said header frame and being located adjacent a transverse tab at a rear end of the bracket; an elongate bolt extending rearwardly through said tab and retainer; a coil compression spring being received on said bolt behind said retainer; and a washer being received on said bolt and secured against a rear end of said spring by a nut threaded onto said bolt, whereby adjusting said nut along said bolt can establish a desired preload in said spring for resisting upward movement of said at least one arm and upper roll.

13. The conditioner roll arrangement defined in claim 11 and further including a down stop connected between said header frame and said at least one arm for presetting said initial position of said at least one arm and upper roll so as to establish a desired initial gap between said upper and lower rolls.

14. The conditioner roll arrangement defined in claim 13 wherein said down stop comprises an L-shaped rod having a lower end secured in a bracket fixed to said at least one arm; a retainer forming part of said header frame and including a generally horizontal region spaced vertically above said bracket; said rod extending through said region of said retainer and having a threaded upper end; and an adjustment nut being received on said threaded upper end of said rod.

\* \* \* \* \*

UNITED STATES PATENT AND TRADEMARK OFFICE
CERTIFICATE OF CORRECTION

PATENT NO. : 5,531,062
DATED : 2 July 1996
INVENTOR(S) : Ernest Pfrimmer

It is certified that error appears in the above-indentified patent and that said Letters Patent is hereby corrected as shown below:

In Col. 5, lines 48, 53 and 55, delete "suppose" and insert -- support --.

Signed and Sealed this

Twenty-second Day of October, 1996

Attest:

BRUCE LEHMAN

*Attesting Officer*  *Commissioner of Patents and Trademarks*